United States Patent
Jalali et al.

(10) Patent No.: US 12,199,666 B1
(45) Date of Patent: Jan. 14, 2025

(54) OPTICAL ANTENNA APPARATUS FOR FREE-SPACE OPTICAL COMMUNICATION

(71) Applicant: WIRELESS PHOTONICS LLC, Newport Beach, CA (US)

(72) Inventors: Bahram Jalali, Los Angeles, CA (US); Mehdi Hatamian, Mission Viejo, CA (US); Arman Rofougaran, Newport Coast, CA (US); Milan Rofougaran, Newport Coast, CA (US)

(73) Assignee: WIRELESS PHOTONICS LLC

( * ) Notice: Subject to any disclaimer, the term of this patent is extended or adjusted under 35 U.S.C. 154(b) by 0 days.

(21) Appl. No.: 18/430,988

(22) Filed: Feb. 2, 2024

(51) Int. Cl.
*H04B 10/11* (2013.01)
*G02B 6/26* (2006.01)
*H04B 10/40* (2013.01)

(52) U.S. Cl.
CPC ............ *H04B 10/11* (2013.01); *G02B 6/262* (2013.01); *H04B 10/40* (2013.01)

(58) Field of Classification Search
CPC ......... H04B 10/11; H04B 10/40; G02B 6/262
USPC ....................................................... 398/128
See application file for complete search history.

(56) References Cited

U.S. PATENT DOCUMENTS

| 6,904,199 B2 * | 6/2005 | Zuluaga ............. G02B 6/262 |
| | | 385/36 |
| 8,320,767 B2 | 11/2012 | Morris et al. |
| 2005/0013616 A1 | 1/2005 | Yen |
| 2017/0254958 A1 | 9/2017 | Yue |
| 2018/0227054 A1 | 8/2018 | Hreha |
| 2020/0025884 A1 * | 1/2020 | Sugita ............... G02B 6/262 |
| 2021/0075188 A1 * | 3/2021 | Tomita ............. H01S 5/02251 |

FOREIGN PATENT DOCUMENTS

CN 201885078 U * 6/2011

OTHER PUBLICATIONS

Translation.*
Non-Final Office Action For U.S. Appl. No. 18/924,500 dated Nov. 26, 2024.

* cited by examiner

*Primary Examiner* — Mohammad R Sedighian
(74) *Attorney, Agent, or Firm* — CHIP LAW GROUP

(57) ABSTRACT

An optical antenna apparatus for free-space optical communication, includes an input end having a lens positioned to receive one or more incoming optical signals, where the one or more incoming optical signals are received from one or more optical fibers connected at the input end. The optical antenna apparatus further includes an output end having a prism positioned at a defined distance from the lens. The one or more incoming optical signals of the one or more optical fibers passes through the lens and then the prism to form one or more free-space optical beams for a bi-directional free-space optical communication with a remote optical node.

19 Claims, 4 Drawing Sheets

OPTICAL ANTENNA APPARATUS FOR FREE-SPACE OPTICAL COMMUNICATION

CROSS-REFERENCE TO RELATED APPLICATIONS/INCORPORATION BY REFERENCE

This application makes reference to U.S. application Ser. No. 18/407,654, which was filed on Jan. 9, 2024.

The above reference application is hereby incorporated herein by reference in its entirety.

FIELD OF TECHNOLOGY

Certain embodiments of the disclosure relate to wireless communication and antenna systems. More specifically, certain embodiments of the disclosure relate to an optical antenna apparatus for free-space optical communication, for example, in an indoor area.

BACKGROUND

Conventional communication devices, such as a wireless access point (WAP) or wireless routers, are often used in an indoor area to extend the wireless coverage of an existing Wi-Fi® signal to access Internet and to increase the numbers of end devices (users) that are capable to use Wi-Fi® may connect to the WAP. However, Wi-Fi® signals by virtue of the limitation of the Wi-Fi® communication protocol have a defined range beyond which the connectivity is lost. Moreover, under ideal conditions, typically 2.4 GHz Wi-Fi® supports up to 450 Mbps or 600 Mbps, and 5 GHz Wi-Fi® supports up to 1300 Mbps. Recently, progress has been made in developing Wi-Fi® communication in 6 GHz band, for example, for Wi-Fi® 6, 6E, Wi-Fi 7 etc., for increasing data throughput. However, the technical issue of limited coverage area and signal attenuation with increasing distance from a Wi-Fi® signal broadcast device remains. This is the reason why Ethernet cables are still widely used as primary connectors in a conventional Ethernet Local Area Network (LAN) to connect different routers, switches, hubs, and gateway devices in an enterprise to provide a reliable connectivity. Ethernet connects any computer or other electronic device to its network as long as the device has an Ethernet adapter or a network card. Since all the network devices need to be connected to their individual power source, and cables need to run through walls, re-designing an enterprise LAN often becomes a herculean task. For instance, network maintenance may require changing or replacing cables and costly intermediate network devices that often causes damage to the walls and installation points for deployment or re-deployment.

Currently, optical antennas are an emerging concept in physical optics, and mostly, research is ongoing and mostly limited to conversion of energy of free propagating radiation to localized energy, and vice versa. The absence of optical antennas in practical technological applications is primarily associated with their small scale as the current focus is limited to developing nano-scale structures, which have their own challenges, such as size and fabrication challenges. For example, at the nanoscale, precise design and fabrication can be technically demanding and expensive, and further not suitable for high-performance wireless optical communication at gigabit rate from one optical node to another remote optical node, for example, in an indoor area.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

An optical antenna apparatus for free-space optical communication, for example, in an indoor area, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Figure 1A:
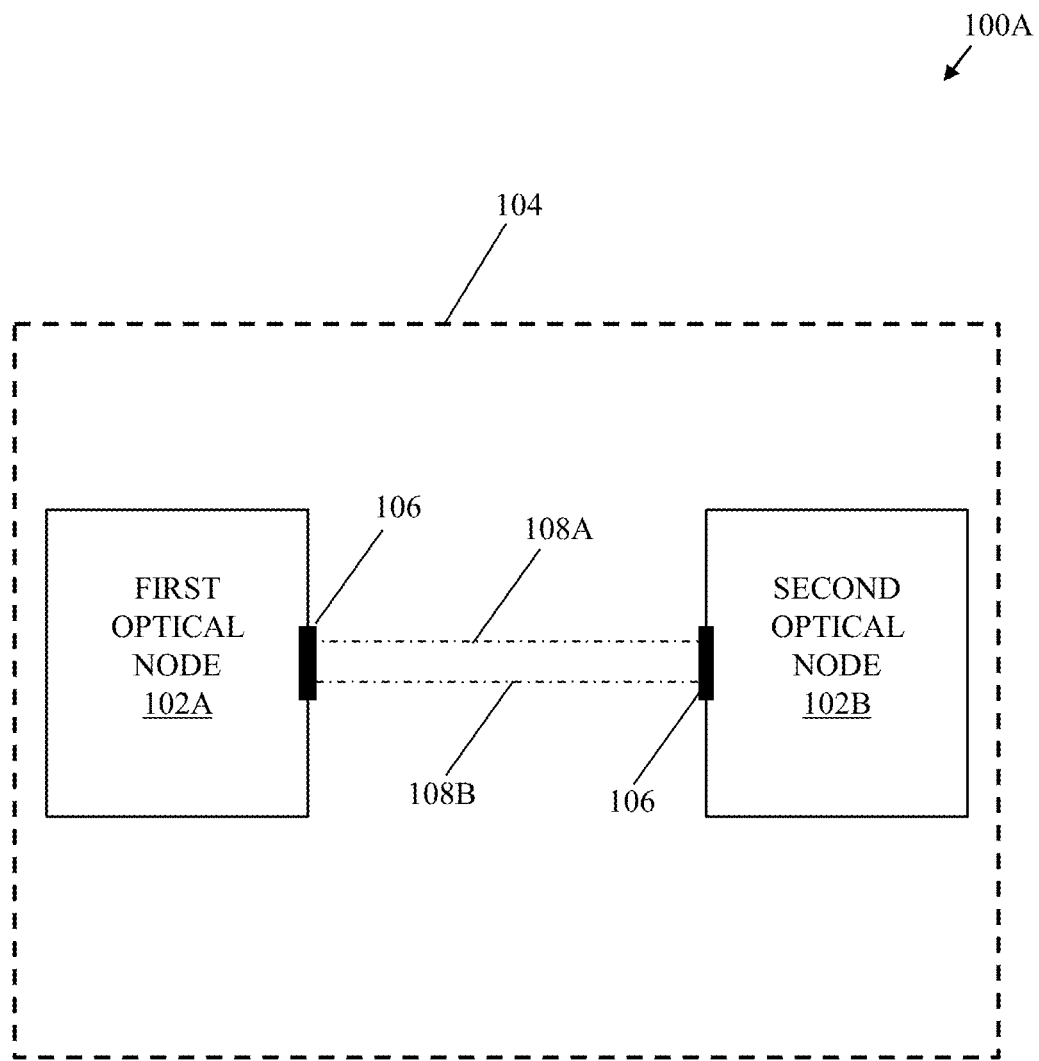
FIG. 1A is a diagram illustrating an exemplary communication system comprising optical nodes with optical antenna apparatus, in accordance with an exemplary embodiment of the disclosure.

Certain embodiments of the disclosure may be found in an optical antenna apparatus for free-space optical communication, for example, in an indoor area. The optical antenna apparatus may be a new device that acts as an optical converter that effectively and efficiently enables conversion of wired communication (e.g., an optical fiber) to wireless free-space optical communication. In an implementation, one end of the optical antenna apparatus may be removably attached as a plugin to an optical transceiver (TRx) or an optical amplifier allowing for flexibility and interchangeability. The optical antenna apparatus enables formation of a Laser Beam Mesh Network (LBMN) or a Laser Beam Cascaded Network (LBCN) in the indoor area.

Additionally, the optical antenna apparatus may be provided in an optical node, where the optical antenna apparatus enables establishment of a free-space optical link as a laser backhaul with a second optical node by directing one or more free-space laser beam carrying data signals in a non-visible light spectrum to the second optical node. The optical antenna apparatus ensures not only the inherent benefits of optical communication like enhanced data security, comparably high throughput as compared to RF only communication but unlike conventional systems, significantly improves continuity of data traffic at consistent high throughput rate (e.g., in multi gigabits) in both upstream and downstream communication. Moreover, due to much smaller wavelength as compared to RF communication, the optical antenna apparatus makes the optical beams diffract (i.e., spread) much less than RF beams, and thus for point-to-point communication, optical free-space communication is more energy efficient than the RF communication.

Furthermore, in an example, in the conventional GPON star topology, an optical spitter may be connected to an optical fiber cable, in which upstream traffic is not continuous but composed of bursts (data bursts) as each user is given a time slot on which data can be transmitted. Typically, there are an optical line terminal (OLT), a number of optical network units (ONUs) or optical network terminals (ONTs) near end users, as well as the conventional optical splitter. For downstream communication in the conventional optical networks like GPON, OLT sends frames of data to the conventional optical splitter continuously, and the conventional optical splitter sends the same set of frames to each ONU, and ONU filters out only frames specific to an end-user device and discards all other frames.

The disclosed optical antenna apparatus solves the above technical problem of the conventional GPON based systems, by constructing one or more free-space optical links in a laser beam-based wireless communication network for actual data communication. This results in provisioning a full coverage with significantly improved SNR in the indoor area with high-speed data connectivity across all nooks and corners of the indoor area. There is no need to deploy intermediate RF routers that process signals, for example, for signal amplification and routing.

The optical antenna apparatus improves network redundancy and network scalability but also enables almost near zero latency communication and an always-connected experience. Generally, optical beams and RF beams both travel at the speed of light, so the latency for free-space travel may be almost the same. The network redundancy refers to a mechanism or a way to provide multiple paths for traffic, so that data can keep flowing even in the event of a failure, and thus high network redundancy means high reliability. The term network scalability refers to an ability of a communication network to handle increasing workloads in a cost-effective and sustainable way, for example, by expanding the network's bandwidth capacity and supporting its physical expansion to new physical areas. Beneficially, the disclosed optical antenna apparatus can handle and serve a massive number of wireless sensors and IoT devices and meet their quality-of-service (QOS) requirements. The optical antenna apparatus improves data transfer rates between at least two optical nodes as compared to existing wireless systems (e.g., conventional wireless local area networks). In the following description, reference is made to the accompanying drawings, which form a part hereof, and in which are shown, by way of illustration, various embodiments of the present disclosure.

FIG. 1A is a diagram illustrating an exemplary communication system comprising optical nodes with optical antenna apparatus, in accordance with an exemplary embodiment of the disclosure. With reference to FIG. 1A, there is shown a communication system 100A that may include a plurality of optical nodes 102, such as a first optical node 102A and a second optical node 102B, in a defined indoor area 104. Each of the first optical node 102A and the second optical node 102B may include an optical antenna apparatus 106. There is further shown a first free-space optical beam 108A and a second free-space optical beam 108B.

Each of the plurality of optical nodes 102 may be a wireless access point or a wireless router, a home gateway device, a fixed wireless access (FWA) device, a network controller, or other optical node configured for free-space optical communication. Each of the plurality of optical nodes 102 may be mounted on a ceiling surface or a wall surface. In an implementation, each of the plurality of optical nodes 102 may be one of: a master communication device, an optical routing device, or a service communication device, described for example, in U.S. application Ser. No. 18/407,654, which was filed on Jan. 9, 2024.

The defined indoor area 104 may be an indoor area of an enterprise, an apartment, a building, or other indoor area of a building.

In accordance with an embodiment, the first optical node 102A may be at a first location in the defined indoor area 104. The second optical node 102B may be at a second location in the defined indoor area 104. The first optical node 102A may be configured to establish a radio frequency (RF) supervisory link with the second optical node 102B. Each of the first optical node 102A and the second optical node 102B may include an RF antenna (different from the optical antenna apparatus 106). The RF supervisory link with the second optical node 102B may be established when each of the first optical node 102A and the second optical node 102B may be powered ON. Once the RF supervisory link is established, it may be used to monitor, control, and troubleshoot each of the first optical node 102A and the second optical node 102B. In other words, each of the first optical node 102A and the second optical node 102B may be further configured to dynamically adjust an orientation, a tilt, and/or an angle with respect to a corresponding reference point for optical alignment. The corresponding reference point may be mounting surface of an optical node or an imaginary reference surface, running parallel to a ceiling surface or a wall surface in the defined indoor area 104. The time taken for optical alignment is significantly reduced in the present disclosure using the optical antenna apparatus 106. The optical antenna apparatus 106 may be used for free-space optical communication between the first optical node 102A and the second optical node 102B. In other words, bi-directional data communication (transmitting and receiving) occurs via optical beams (i.e., over-the-air laser beams) between the first optical node 102A and the second optical node 102B using the optical antenna apparatus 106 at each of the first optical node 102A and the second optical node 102B.

The optical antenna apparatus 106, for example, in the first optical node 102A, may include an input end comprising a lens positioned to receive one or more incoming optical signals, where the one or more incoming optical signals are received from one or more optical fibers connected at the input end. The optical antenna apparatus 106 may further include an output end comprising a prism positioned at a defined distance from the lens, where the one or more incoming optical signals of the one or more optical fibers passes through the lens and then the prism to form one or more free-space optical beams (e.g., the first free-space optical beam 108A and the second free-space optical beam 108B) for the bi-directional free-space optical communication with a remote optical node, such as the second optical node 102B. The optical antenna apparatus 106 is described in detail, for example, in FIGS. 2A and 2B. The optical antenna apparatus 106 is easy to manufacture as it's not a nanoscale structure and achieves high-performance wireless optical communication at multi gigabit rate from one optical node to another remote optical node in the defined indoor area 104.

The first optical node 102A may be further configured to establish one or more free-space optical links as a laser backhaul with the second optical node 102B by directing the one or more free-space optical beams (e.g., the first free-space optical beam 108A and the second free-space optical beam 108B) from the optical antenna apparatus 106 carrying data signal in a non-visible light spectrum to the second optical node 102B. On the other hand, the optical antenna apparatus 106 of the second optical node 102B (i.e., the remote optical node) may be configured to receive the one or more free-space optical beams (e.g., the first free-space optical beam 108A and the second free-space optical beam 108B) and redirect to one or more other optical nodes of the plurality of optical nodes 102 in the defined indoor area 104 to form a Laser Beam Mesh Network (LBMN) or a Laser Beam Cascaded Network (LBCN).

Beneficially, unlike mesh RF networks or WLAN networks, the established free-space optical link(s) used as the laser backhaul may not be susceptible to interference from radio waves or other electromagnetic radiation, thereby providing a high degree of reliability. Further, the free-space optical links between the first optical node 102A and the second optical node 102B due to almost zero pointing error provides data through rate greater than a threshold, for example, in multi-gigabits or terabits. The first free-space laser beam may carry data signal in a very small space as compared to RF channel, transmissions achieving high-speed data transmission, such as 4K video streaming and high-performance computing. This ensures not only the inherent benefits of optical communication like enhanced data security, comparably high throughput as compared to RF only communication but unlike conventional systems, significantly improves continuity of data traffic at consistent high throughput rate (e.g., in multi gigabits) in both upstream and downstream communication. Moreover, due to much smaller wavelength as compared to RF communication, optical beams diffract (i.e., spread) much less than RF beams, and thus for point-to-point communication, optical free-space communication is more energy efficient than the RF communication.

Figure 1B:
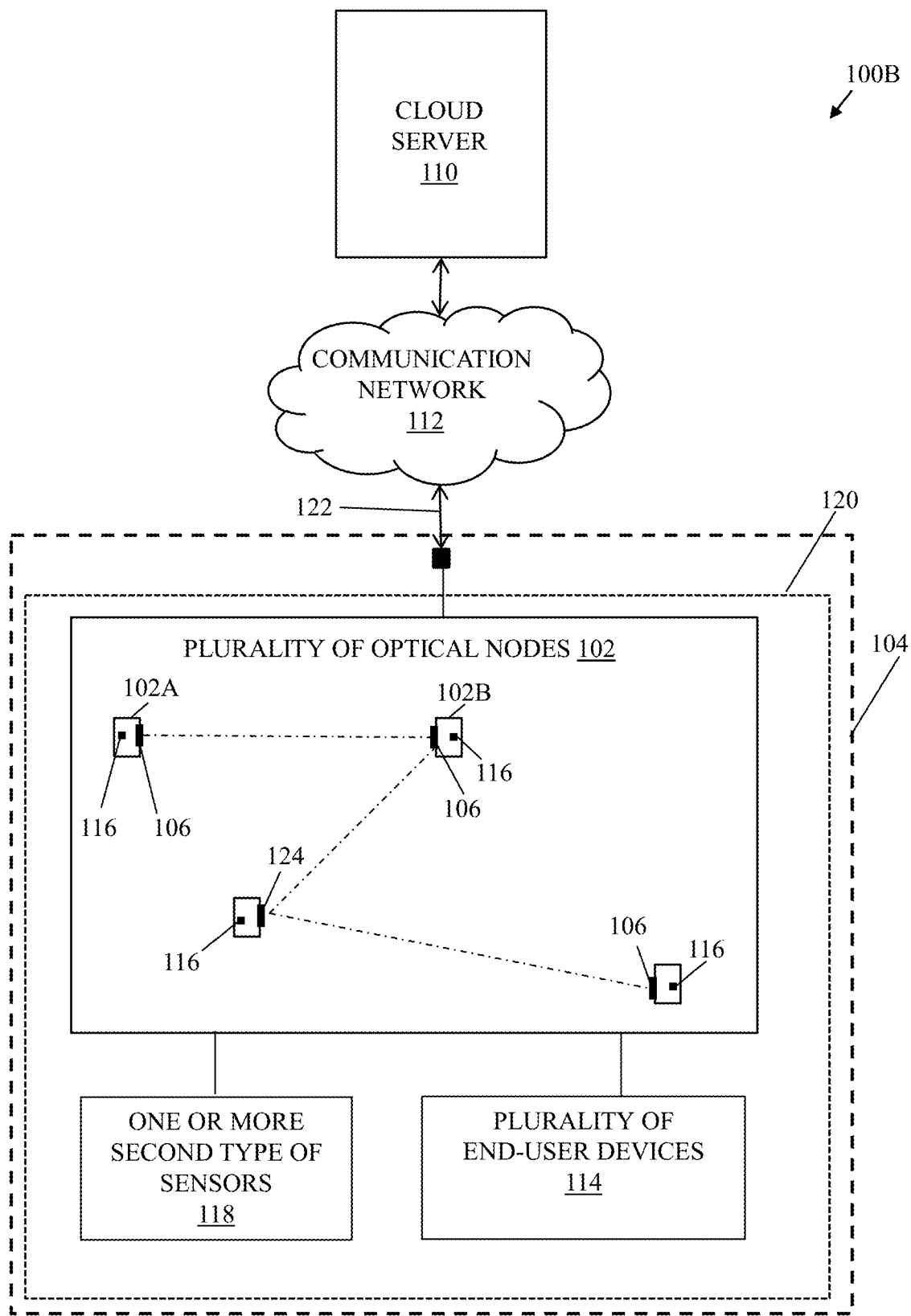
FIG. 1B is a diagram illustrating an exemplary communication system comprising cloud server and optical nodes with optical antenna apparatus, in accordance with another exemplary embodiment of the disclosure.

FIG. 1B is a diagram illustrating an exemplary communication system comprising cloud server and optical nodes with optical antenna apparatus, in accordance with another exemplary embodiment of the disclosure. With reference to FIG. 1B, there is shown a communication system 100B that may include the plurality of optical nodes 102 in the defined indoor area 104. In an implementation, the communication system 100B may include a cloud server 110 that is communicatively coupled to the plurality of optical nodes 102 via the communication network 112 (e.g., the Internet). There is further shown a plurality of end-user devices 114, one or more first types of sensors 116, and one or more second types of sensors 118 in the defined indoor area 104. Each optical node or some of the plurality of optical nodes 102 may include one or more first type of sensors 116 and the optical antenna apparatus 106. In certain scenarios, some of the intermediate nodes, also referred to as optical routing nodes, of plurality of optical nodes 102, may not include the optical antenna apparatus 106, and may instead include a deflecting surface 124 (also referred to as beam routing regions or deflection regions) to deflect one or more optical beams received from other optical nodes. The one or more first type of sensors 116 are sensors that may be generally in-built in each optical node, whereas the one or more second type of sensors 118 may be the sensors that are provided in the defined indoor area 104 but are disposed external to each optical node and communicatively coupled to one or more optical nodes of the plurality of optical nodes 102. The plurality of end-user devices 114 and the one or more second types of sensors 118 may be communicatively coupled to one or more of the plurality of optical nodes 102. There is further shown a laser beam based wireless communication network 120.

In an implementation, each of the plurality of optical nodes 102 may be a modified and intelligent wireless access point that may use an existing Wi-Fi® signal in the RF medium to control one or more of other optical nodes while employing laser beams to form the laser beam based communication network 120 to wirelessly communicate data in a cascaded structure or a mesh structure among the plurality of optical nodes 102 to reach to the plurality of end-user devices 114. Some of the plurality of optical nodes 102 may be a battery-operated device, which is easy to deploy in the defined indoor area 104.

The cloud server 110 includes suitable logic, circuitry, and interfaces that may be configured to communicate with one or more of the plurality of optical nodes 102. In an example, the cloud server 110 may be a remote management server that is managed by a third party different from the service providers associated different cellular or wireless carrier networks or Internet service providers. In another example, the cloud server 110 may be a remote management server or a data center that is managed by a third party, or jointly managed, or managed in coordination and association with one or more of the cellular or wireless carrier networks or Internet service providers. In an implementation, the cloud server 110 may be a master cloud server or a master machine that is a part of a data center that controls an array of other cloud servers communicatively coupled to it, for load balancing, running customized applications, and efficient data management.

The communication network 112 may include a medium through which the cloud server 110 and the one or more of the plurality of optical nodes 102 may communicate with each other. At least one optical node, such as the first optical node 102A (i.e., a master communication device), may be configured to obtain a first data signal from a data source 120 coupled to the communication network 112. The data source 120 (e.g., a modem) may be used to provide an Internet connection via the communication network 112 from an Internet service provider or from a core network of a telecommunication network. Examples of the communication network 112 may include, but are not limited to, at least one of a Transmission Control Protocol and Internet Protocol (TCP/IP), Hypertext Transfer Protocol (HTTP), the Internet, a cloud network, an optical fiber, a coaxial cable, or other backhaul connectivity medium.

The plurality of end-user devices 114 may include user equipment (UEs), or other consumer electronic devices. Each of one or more UEs may correspond to a telecommunication hardware used by an end-user to communicate. Alternatively stated, the one or more UEs may refer to a combination of a mobile equipment and subscriber identity module (SIM). Examples of the one or more UEs may include, but are not limited to a smartphone, a virtual reality headset, an augment reality device, a wireless modem, a satellite television set-top box, a VoIP station, or any other customized hardware for telecommunication and Internet connectivity. In an implementation, one of more of the plurality of end-user devices 114, such as a smartphone, may have a laser network control application, installed therein. The application may allow an administrator to monitor and reconfigure the laser beam based wireless communication network 120 via the laser network control application installed in the smartphone.

The one or more first type of sensors 116 may be provided at each optical node of the plurality of optical nodes 102. In some cases, some sensors of the one or more first type of sensors 116 may be deployed external to the optical node in the defined indoor area 104. In an implementation, the one or more first type of sensors 116 may include an electronic compass and a geospatial sensor (e.g., a GPS sensor). In some implementations, the one or more first type of sensors 116 may further include magnetic and gravity field sensors, an accelerometer, a gyroscope, and a gimbal. Other examples of the one or more first type of sensors 116 one or more motorized altazimuth, one or more Micro Electronic Mechanical Systems (MEMS) motion sensor, and the like.

The one or more second type of sensors 118 may be deployed in the defined indoor area 104 and may lie external to at each optical node of the plurality of optical nodes 102. Examples of the one or more second type of sensors 118 may include but are not limited to an image-capture device. The image-capture device can be used to capture an image of the beacon IR laser beam. The image can then be processed to determine the position of the beacon IR laser beam. This information can then be used to adjust the position of the optical nodes until they are aligned. The use of the one or more second type of sensors 118 further improves the accuracy and reliability of the optical alignment process. By detecting the beacon IR laser beam, the first optical node 102A to the second optical node 102B may be mutually aligned in an optical path more accurately. For instance, the first optical node 102A may emit the beacon IR laser beam, the second optical node 102B may use the image-capture device to capture an image of the beacon IR laser beam, the image-capture device 118A processes the image to determine the position of the beacon IR laser beam, and finally the second optical node 102B may utilize the information from the image-capture device to adjust its position until it is aligned with the first optical node 102A. This process may be repeated until the optical nodes are aligned to the defined level of accuracy.

The laser beam based wireless communication network 120 may be formed by the plurality of optical nodes 102 in the defined indoor area 104.

The data source 122 may be a medium through which a backhaul connection is provided to at least one optical node, such as the first optical node 102A, of the plurality of optical nodes 102. Examples of the data source 122 may be a fiber optic cable, or a coaxial cable for Internet connectivity.

In accordance with an embodiment, the plurality of optical nodes 102 may be distributed at a plurality of different locations in the defined indoor area 104. The first optical node 102A may be configured to establish a radio frequency (RF) supervisory link with the second optical node 102B of the plurality of optical nodes 102. The first optical node 102A may perform a first optical alignment (e.g., a coarse alignment) with the second optical node 102B based on sensor measurements from the one or more first type of sensors 116, where the sensor measurements at each of the first optical node 102A and the second optical node 102B may be exchanged between the first optical node 102A and the second optical node 102B over the established RF supervisory link for the first optical alignment. The first optical node 102A may be further configured to perform a second optical alignment (e.g., a fine alignment) with the second optical node 102B by directing a beacon infrared (IR) laser beam from the first optical node 102A to the second optical node 102B. In an implementation, the beacon IR laser beam may be in the visible light spectrum so that the beacon IR laser beam may be monitored by one or more second types of sensors 118, such as the image-capture device in the defined indoor area 104. Thereafter, the first optical node 102A may be further configured to establish one or more free-space optical links as a laser backhaul with the second optical node 102B by directing one or more free-space optical beams carrying data signal in a non-visible light spectrum to the second optical node 102B based on the first optical alignment and the second optical alignment. This ensures not only the inherent benefits of optical communication like enhanced data security, comparably high throughput as compared to RF only communication but unlike conventional systems, significantly improves continuity of data traffic in both upstream and downstream communication. The intelligent hybrid of photonics and radio frequency (RF) communication with sensor-assisted intelligent free-space optical backhaul not only improves network redundancy and network scalability but also enables almost near zero latency communication and an always-connected experience. Beneficially, the communication system 100A or 110B can handle and serve a massive number of wireless sensors and IoT devices and meet their quality-of-service (QOS) requirements. Unlike the conventional wireless communication systems, the communication system 100A or 100B is designed in such a way that the communication range can be extended without any compromise in signal quality and data throughput rate. In fact, the communication system 100A improves data transfer rates between at least two communication devices as compared to existing wireless systems (e.g., conventional Wi-Fi® systems).

In accordance with an embodiment, each of the first optical node 102A and the second optical node 102B may be further configured to monitor transmitted laser power as well as an optical receiver signal strength indicator (RSSI) at the optical antenna apparatus 106. At each optical node, transmitted laser power may be monitored as well as the optical RSSI. Each of the first optical node 102A and the second optical node 102B may be further configured to re-execute optical alignment when the transmitted laser power is not degraded but the optical RSSI indicates a drop in laser power at one of the first optical node 102A or the second optical node 102B. In other words, if the laser power has not degraded but the optical receiver RSSI indicates a drop in power, then an automatic optical alignment routine may be executed. In an implementation, the optical RSSI and transmit laser power may be monitored and reported back to a master communication device (e.g., the first optical node 102A) or the cloud server 110 (hosting network management software) via a radio frequency (RF) wireless connectivity. Additionally, visible color LED's may be provided on each optical node to indicate a connection status. For example, when a laser beam link is operating properly, the LED may be green at such particular node. When power is below a defined level, the indicator may turn orange and when the laser link is interrupted, it may turn red. Further, when the communication system 100B may be executing an alignment procedure, the LED indicator may keep flashing.

In accordance with an embodiment, the first optical node 102A may be further configured to determine a laser intensity to be set for the first free-space laser beam based on the optical receiver signal strength indicator at the second optical node 102B. This is done to ensure that the optical RSSI at the second optical node 102B may be within a predetermined range. If the optical RSSI is less than a threshold optical RSSI, the laser intensity may be increased. If the optical RSSI is much more (e.g., 20% more) than the threshold optical RSSI, the laser intensity may be decreased. This helps to ensure that the data signal may be received at the second optical node 102B without being distorted or lost. The laser intensity may be the amount of power that is emitted by the first free-space laser beam.

In accordance with an embodiment, the first optical node 102A may be further configured to determine a thermomechanical-induced change in an alignment of an optical path of the first optical node 102A with the second optical node 102B. The thermomechanical-induced change in the alignment of the optical path may be the change in the alignment of the optical path caused by changes in temperature or mechanical stress at each optical node. These changes can cause the optical path to shift, which can lead to errors in the transmission of optical signals. For example, as temperature changes, the optical elements in each optical node may deform over time. In certain scenarios, the surrounding atmosphere may not be perfectly still, and there may be small fluctuations in the density of the air. These fluctuations may cause the change in the alignment of the optical path of the first optical node 102A with the second optical node 102B. Sometimes, mechanical stress due to vibrations or the weight of the optical elements, may also contribute to the thermomechanical-induced change. Depending on the extent of the change, the first optical node 102A may be further configured to execute an automatic re-alignment of the optical path. It may be done when the temperature monitored by a temperature sensor in the one or more first type of sensors 116 is outside a pre-set range. In an example, the second optical alignment may be re-executed by use of one or more motors or actuators to move the optical elements.

In accordance with an embodiment, each of the first optical node 102A and the second optical node 102B may be a part of a Laser Beam Mesh Network (LBMN) or a Laser Beam Cascaded Network (LBCN) formed using a plurality optical nodes disposed at a plurality of locations in the defined indoor area. The LBMN or the LBCN may be generated using the plurality of optical nodes 102 disposed at the plurality of different locations in the defined indoor area 104.

In accordance with an embodiment, the sensor measurements from the one or more first type of sensors 116 and visual data from the one or more second type of sensors 118 may be communicated to the cloud server 110. Each of the first optical node 102A and the second optical node 102B may be further configured to re-execute optical alignment based on a Laser Beam Network Control (LBNC) instruction received from the cloud server 110.

In accordance with an embodiment, when the second optical node 102B is a service communication device, the second optical node 102B may be further configured to detect the first free-space laser beam 108A or 108B carrying the data signal in the downstream path. When the second optical node 102B is the service communication device, the second optical node 102B may be further configured to demodulate the data signal from the first free-space laser beam 108A or 108B and distribute one or more wireless RF signals to the one or more end-user devices of the plurality of end-user devices 114. The demodulation may depend on the modulation technique used during the modulation of the data signal in the first free-space laser beam. For example, in some cases, the data signal may be present in a RF carrier wave, which may be modulated together (RF carrier wave along with data) at the first optical node 102A (i.e., when the first optical node 102A is the master communication device) without extracting the data signal as baseband signals from the RF carrier wave. Thereafter, the RF carrier wave along with data signal may be passed to the front-end RF circuitry of the service communication device, from where the data signal(s) is distributed as RF signals (i.e., as Wi-Fi® signals over RF carrier frequency at 2.5-7 GHZ or may be beamformed in RF medium at 5G carrier frequency). In another example, the data signal may be received by one of the plurality of optical nodes 102 via an optical fiber connection. In such a case, a free-space optical converter that may be an optical component that plugs into a SFP (small form-factor pluggable) module and converts the data signal from a fiber port (e.g., of the SFP module) to one or more free space optical beams, such as the first free-space laser beam. In such a case, the data signal remain in baseband form in the first free-space laser beam, which may be easily and quickly recovered at the second optical node 102B (e.g. a service communication device) and passed directly to the front-end RF circuitry of the service communication device, from where the data signal may be distributed as RF signals (i.e., as Wi-Fi® signals over RF carrier frequency at 2.5-7 GHZ or may be beamformed in RF medium at 5G carrier frequency). In yet another example, the demodulation of the data signal from the first free-space laser beam 108A or 108B may be carried out using one or more known demodulation methods in free-space optics communication. For example, using direct detection, a coherent detection, a Frequency-shift keying (FSK) demodulation, a Phase-shift keying (PSK) demodulation, an Amplitude shift keying (ASK) demodulation, and the like.

In accordance with an embodiment, the second optical node 102B (when implemented as the service communication device) may be further configured to obtain one or more data signals from one or more end-user devices and re-transmit the obtained one or more data signals over the same first free-space laser beam by WDM (in this case, the upstream data and the downstream data may be segregated using WDM or TDD) or another free-space laser beam in an upstream path to the source optical node (such as the first optical node 102A or the master communication device). The one or more data signals may be data signals received over RF waves from the one or more end-user devices. The second optical node 102B may be further configured to extract user data (i.e., data signals) and modulate the extracted user data into the first free-space laser beam or the second free-space laser beam, which may be then transmitted to the first optical node 102A via a mesh network of the plurality of optical nodes 102.

In accordance with an embodiment, the data signal from the first free-space laser beam may be recovered by the second optical node 102B or one of the plurality of optical nodes 102 (e.g., a service communication device) and distributed into a plurality of different radio frequency (RF) signals associated with different communication protocols having different communication ranges (e.g., BLUETOOTH™, Wi-Fi®™, Li-Fi, a citizens broadband radio service (CBRS) signal, and/or a wireless personal area network (WPAN) signal) to serve the one or more end-user devices in accordance with their wireless communication capabilities. The one or more optical nodes may be further configured to pack the content received from its corresponding end-user devices and transmit upstream over the first free-space laser beam or the second free-space laser beam to the first optical node 102A (e.g., the master communication device) via the plurality of other optical nodes.

Figure 2A:
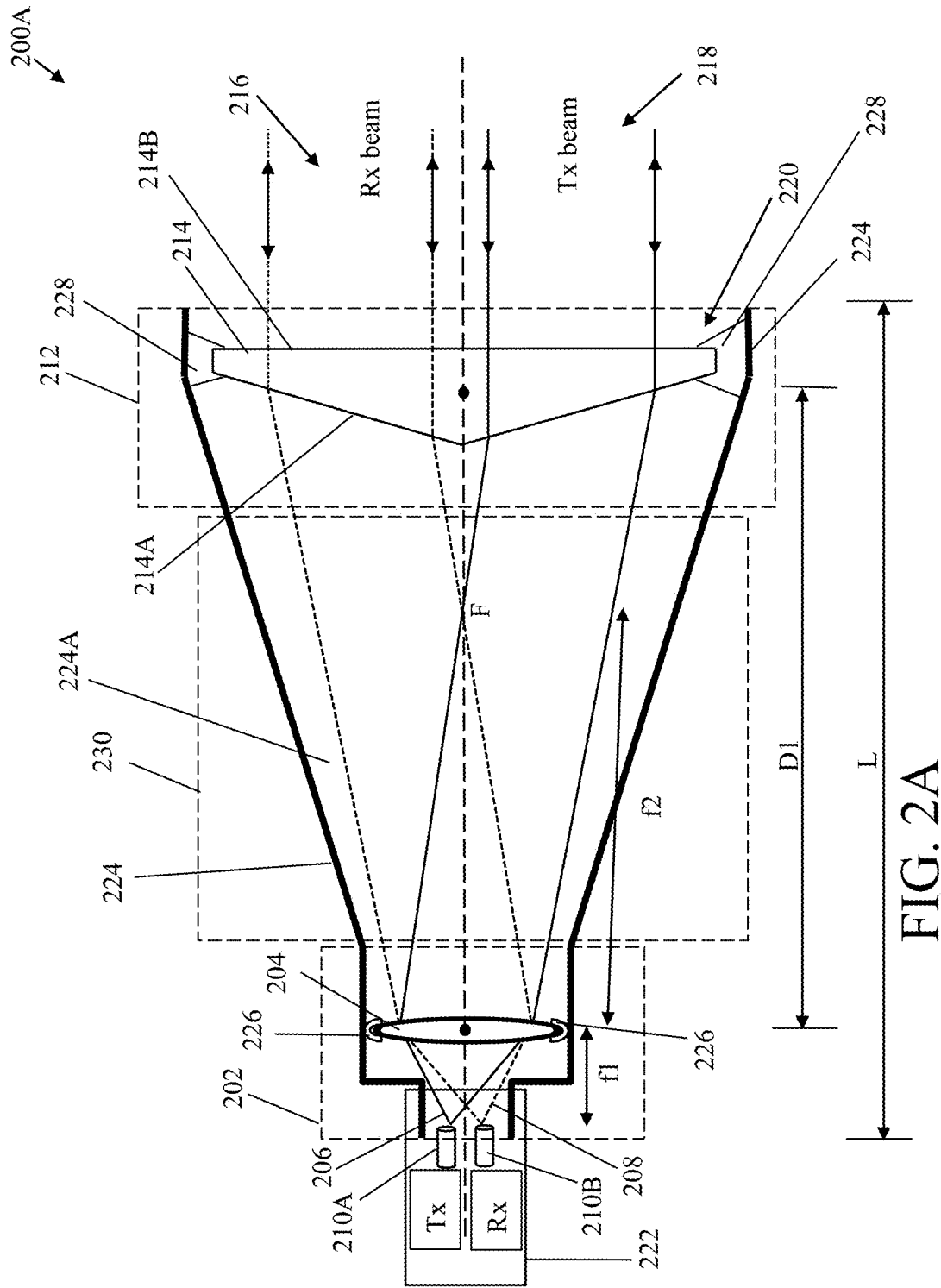
FIG. 2A is a diagram that illustrates various components of an exemplary optical antenna apparatus, in accordance with an exemplary embodiment of the disclosure.

FIG. 2A is a diagram that illustrates various components of an exemplary optical antenna apparatus, in accordance with an exemplary embodiment of the disclosure. FIG. 2A is explained in conjunction with elements from FIGS. 1A and 1B. With reference to FIG. 2A, there is shown an optical antenna apparatus 200A for free-space optical communication. The optical antenna apparatus 200A may correspond to the optical antenna apparatus 106 of FIG. 1A and FIG. 1B.

The optical antenna apparatus 200A may include an input end 202 comprising a lens 204 positioned to receive one or more incoming optical signals 206 and 208, where the one or more incoming optical signals 206 and 208 may be received from one or more optical fibers 210A and 210B connected at the input end 202. The optical antenna apparatus 200A may be a wire-to-wireless optical converter that converts optical signals (e.g., the one or more incoming optical signals 206 and 208) travelling through a wired medium, such as an optical fibre (e.g., one or more optical fibers 210A and 210B) to one or more wireless free-space optical beams, such as the one or more free-space optical beams 216 and 218. In other words, the optical antenna apparatus 200A acts as a bridge between the guided transmission of optical signals through the one or more optical fibers 210A and 210B and the propagation of the optical signals through free space as the one or more free-space optical beams 216 and 218. The optical antenna apparatus 200A may be configured to acquire optical signals transmitted through the one or more optical fibers 210A and 210B at one end (i.e., the input end 202) of the optical antenna apparatus 200A and transform the optical signals to the one or more free-space optical beams 216 and 218 that may be emitted from the other end (i.e., an output end 212) of the optical antenna apparatus 200A. In other words, the optical antenna apparatus 200A may be a device or system designed to interface between the one or more optical fibers 210A and 210B and the one or more free-space optical beams 216 and 218. The input end 202 may be a part of the optical antenna apparatus 200A where the optical signals (e.g., the one or more incoming optical signals 206 and 208) may be received, and thus may be an entry point of the optical conversion process. The lens 204, positioned at the input end 202, may be used to collect and focus the one or more incoming optical signals 206 and 208 onto the next stage of the conversion process. In an example, each of the one or more optical fibers 210A and 210B may be a single-mode optical fiber or a multimode optical fiber.

In accordance with an embodiment, the lens 204 is a convex lens. The convex shape of the lens 204 enables to acquire the one or more incoming optical signals 206 and 208 from a wide range of angles (e.g., a 20-to-45-degree cone) at one side and converge the incoming optical signals 206 and 208, after passing through the curved surface of the lens 204, towards the prism 214 at the output end 212. In this embodiment, the incoming optical signal 206 (Tx signal) may intersect with the incoming optical signal 208 (Rx signal) at a focal point F after passing through the lens 204. The lens 204 enhances the signal reception efficiency of the optical antenna apparatus 200A by focusing the one or more incoming optical signals 206 and 208 towards the focal point and further towards the prism 214 for collimation.

In accordance with an embodiment, the input end 202 may be removably attached as a plugin to an optical element 222, which may be an optical transceiver (TRx) or an optical amplifier. The input end 202 may be easily connected and disconnected from the optical element 222, allowing for flexibility and interchangeability. Alternatively in another embodiment, the input end 202 may comprise the optical element 222, which may be the optical TRx or the optical amplifier. The optical element 222 (i.e., the optical TRx or the optical amplifier) may be one of a Small Form-factor Pluggable (SPF) optical module device, an enhanced SPF (SPF+), a ten gigabit SPF (XPF), or other pluggable serial-to-serial data-agnostic multi-rate optical TRx or amplifier, and where the one or more optical fibers 210A and 210B may be connected at the input end 202 via the optical TRx or the optical amplifier, i.e., the optical element 222. The SFP optical module device may be a hot-pluggable, compact, and standardized module widely used for fiber optic communication. The enhanced SFP or SFP+ may be known in the art and may be advanced version of the SFP optical module device, providing higher data rates as compared to the SFP optical module device. The XFP may be another type of pluggable optical module designed specifically for 10 Gigabit Ethernet applications for high-speed data transmission over optical fibers. The other pluggable serial-to-serial data-agnostic multi-rate optical TRx or amplifier may also be known in the art and may be another pluggable module capable of handling serial-to-serial data transmission at various rates, where data-agnostic refers to capability to handle different types of data signals without being specific to any particular protocol or format. The one or more optical fibers 210A and 210B may be physically linked or joined to the optical element 222, which in turn connects to the input end 202 of the optical antenna apparatus 200A. The optical element 222 may act as an intermediary between the one or more optical fibers 210A and 210B and the optical antenna apparatus 200A. For example, the output of the SFP optical TRx or SPF optical amplifier may be plugged to the input end 202 of the optical antenna apparatus 200A.

The optical element 222 (i.e., the optical TRx or the optical amplifier) may be one of a Small Form-factor Pluggable (SPF) optical module device, an enhanced SPF (SPF+), a ten gigabit SPF (XPF), or other pluggable serial-to-serial data-agnostic multi-rate optical TRx or amplifier, known in the art and thus its components are omitted for the sake of brevity. For example, a typical optical TRx or optical amplifier (i.e., SFP/SFP+ module) may include a Transmitter (Tx) and a Receiver (Rx). The Tx may include a Laser Diode Driver (LDD) and a Transmitter Optical Sub-Assembly (TOSA). The Rx may include a Receiver Optical Sub-Assembly (ROSA) and a post-amplifier (AMP). The TOSA may include a Laser Diode (LD) and a monitor photodiode whereas the ROSA may include a Photodiode (PD) and a Transimpedance Amplifier (TIA). There may be a microcontroller and a memory inside the module for serial ID, Digital Optical Monitoring (DOM) and to control the module operation.

The optical antenna apparatus 200A may further include an output end 212 comprising a prism 214 positioned at a defined distance DI from the lens 204, where the one or more incoming optical signals 206 and 208 of the one or more optical fibers 210A and 210B passes through the lens 204 and then the prism 214 to form one or more free-space optical beams 216 and 218 for a bi-directional free-space optical communication with a remote optical node, such as the second optical node 102B. After passing through the lens 204, the where the one or more incoming optical signals 206 and 208 continue their path and reach the prism 214 positioned at the defined distance DI from the lens 204. The prism 214 may manipulate the path of the optical signals, causing them to refract and change direction. This refraction allows the optical signals to exit the optical antenna apparatus 200A and form the one or more free-space optical beams 216 and 218. The one or more free-space optical beams 216 and 218 are collimated free-space optical beams that may be emitted from the first optical node 102A to propagate through the air to reach the second optical node 102B for bi-directional free-space optical communication with the remote optical node, i.e., the second optical node 102B. As long as the remote optical node (i.e., the second optical node 102B) is within the range of the free-space optical beams emitted by the optical antenna apparatus 200A of the first optical node 102A, it can establish a backhaul optical link without the need for physical fiber connections in the defined indoor area 104. By passing through the lens 204 and prism 214, the optical signals (i.e., the one or more incoming optical signals 206 and 208) of the one or more optical fibers 210A and 210B undergo a series of manipulations, where the lens 204 may focus and converge the optical signals, while the prism 214 further refines their direction and shape in the form of the one or more free-space optical beams 216 and 218, thereby providing a much larger area of collimated free-space laser beams as compared to the area occupied during travel through the optical fibers by total internal reflection. This enhances the efficiency and reliability of free-space signal transmission, resulting in improved communication performance. For example, the laser beam alignment errors may be omitted or significantly reduced between the first optical node 102A and the second optical node 102B.

In accordance with an embodiment, the defined distance DI at which the prism 214 is positioned from the lens 204 is greater than a focal length f2 of the lens 204. In an example, by placing the prism 214 at a distance greater than the focal length f2 of the lens 204 may cause the optical beams to increase beam diameter as the optical beams propagates away from the lens 204 before the optical beams strikes the first side 214A of the prism 214, while improving the collimation after exiting the second side 214B of the prism 214. The improvement in collimation means that each of the one or more free-space optical beams 216 and 218 become more parallel and focused but with increased diameter of each beam. This enables improve reachability of the one or more free-space optical beams 216 and 218 towards the remote optical node in terms of extended range while at the same time simplifies the installation and alignment process of optical nodes as each collimated beam with increased diameter allows some margin of error tolerance in optical alignment, simplifying the installation and optical alignment process between two optical nodes. In other words, the optical antenna apparatus 200A reduces the changes of communication failure due to minor or slight misalignment between two optical nodes. In an implementation, by adjusting the DI, a beam diameter size and power density or signal intensity may be adjusted as per use case, for example, depending on the distance of the second optical node 102B from the first optical node 102A.

In accordance with an embodiment, the prism 214 has a first side 214A having a triangular shape and a second side 214B having a planar shape, and where the first side 214A faces the lens 204 and the second side 214B faces away from the lens 204 towards an opening 220 of the output end 212. The first side 214A may have two faces, where once face collects one optical beam (e.g., Rx beam) and another face collects the other beam (e.g., the Tx beam) that becomes collimated when exits from the second side 214B of the prism 214 to form the one or more free-space optical beams 216 and 218.

In accordance with an embodiment, the prism 214 has a size that is larger than the size of the lens 204. By having a larger size, the prism 214 is able to capture a wider range of incoming optical signals from the lens 204. The larger size allows for a larger aperture area, enabling the prism 214 to capture all portions of the incoming optical signals or beams from the lens 204. Further, the larger prism size as compared to the lens 204 may provide more flexibility in aligning the prism 214 with the lens 204, thereby ensuring a proper and stable alignment to maintain a consistent and reliable free-space optical path from the lens 204 to the prism 214.

In accordance with an embodiment, the one or more incoming optical signals 206 and 208 comprises a transmit (Tx) optical signal 206 and a receive (Rx) optical signal 208. The Tx optical signal 206 and the Rx optical signal 208 may be converted concurrently, after passing through the lens 204 and then the prism 214, to a first free-space optical Tx beam 218 and a first free-space optical Rx beam 216, respectively. The Tx optical signal 206 represents the optical signal that is being sent or transmitted from the optical antenna apparatus 200A of the first optical node 102A to the remote optical node, i.e., the second optical node 102B. It may contain data, information, or any other type of optical signal that needs to be transmitted. The Rx optical signal 208 represents the optical signal that is being received by the optical antenna apparatus 200A from a remote optical node, such as the second optical node 102B. Each of the Tx optical signal 206 and the Rx optical signal 208 may carry data signal. The Tx optical signal 206 and the Rx optical signal 208 may pass through the lens 204 and then the prism 214 within the optical antenna apparatus 200A, where the combination of the lens 204 and the prism 214 and their strategic positioning within the housing 224 enables conversion of the Tx optical signal 206 and the Rx optical signal 208 to the first free-space optical Tx beam 218 and the first free-space optical Rx beam 216, respectively.

In accordance with an embodiment, the one or more incoming optical signals 206 and 208 may comprise different optical signals, each having a different wavelength and carrying a corresponding data stream. In a first implementation, there may be two laser beams (the first free-space optical Tx beam 218 and the second free-space optical Rx beam 216) for a free-space laser communication with separate transmission (Tx) and reception (Rx). In such a case, each of the Tx optical signal 206 and the Rx optical signal 208 may have different wavelengths, for example, 1550 nm and 1300 nm bands. Thus, if one wavelength of the Tx optical signal 206 is employed for downstream path (e.g., for Tx) and another wavelength of the Rx optical signal 208 is employed for reception, then there is even no need to have time division duplexing (TDD), thereby reducing latency and increasing data throughput rate in the laser beam based wireless communication network 120 in the defined indoor area 104. In a second implementation, there may be single laser beam for Tx and Rx but at two different wavelengths using wavelength division multiplexing (WDM). In yet another implementation, multiple streams of data may be modulated and transmitted concurrently using wavelength division multiplexing (WDM) at different wavelengths in one optical signal, such as each of the Tx optical signal 206 and the Rx optical signal 208. Additional wavelength channels (i.e., communication data lanes) in each band may offer a path to increasing the data rate. For example, coarse wavelength division multiplexing (CWDM) may allow up to 18 channels and dense wavelength division multiplexing (DWDM) may allow up to 200 channels. Thus, a full coverage with high signal-to-noise (SNR) in the defined indoor area 104 with high-speed data connectivity and continuous upstream and downstream data traffic (e.g., such as voice, video, text, or any other form of communication) to the plurality of end-user devices 114 may be provided without the need to deploy conventional intermediate RF routers simplifying the deployment while significantly improving the data throughput, security, and network reliability as compared to conventional systems.

In accordance with an embodiment, each of the first free-space optical Tx beam 218 and the first free-space optical Rx beam 216 may be in a non-visible light spectrum.

The communication of free-space optical beams in non-visible light spectrum below ceiling improves aesthetics and reduces visual clutter, as it eliminates the need for physical cables or wires. The one or more free-space optical beams 216 and 218 may be communicated in non-visible light spectrum, for example, in the range of 900-1600 nm wavelength, or specifically at 1300 or 1550 nm. In an implementation, the prism 214 may assist in manipulating the path of optical signals or separating them based on their wavelengths.

In accordance with an embodiment, the optical antenna apparatus 200A may further comprise a housing 224 to accommodate and cover the lens 204 and the prism 214. The housing 224 refers to the physical structure or enclosure of the optical antenna apparatus 200A. The housing 224 provides protection and support for the internal components, including the lens 204 and the prism 214 and ensures that the internal components are securely held in place and shielded from external environment. An interior 224A of the housing 224 may comprise a plurality of slots 226 and 228 configured to hold the lens 204 and the prism 214 at their corresponding positions along a length L of the housing 224 such that the prism 214 is positioned at the defined distance DI from the lens 204. The interior 224A of the housing 224 may be the space or cavity inside the housing 224 where the lens 204 and the prism 214 are placed. The slot 226 may have a structure that may be complementary to the shape and structure of the physical ends of the lens 204 (as shown, in FIG. 2A in an example). Similarly, the slot 228 may have a structure that may be complementary to the shape and structure of the physical ends of the prism 214. The plurality of slots 226 and 228 may specifically configured to secure the lens 204 and the prism 214 at their designated positions corresponding positions within the housing 224 to ensure that the lens 204 and the prism 214 are correctly aligned and maintained in the desired spatial arrangement for the proper functioning of the optical antenna apparatus 200A.

In accordance with an embodiment, the housing 224 may be a trapezoid-shaped or a cone-shaped housing. The trapezoid-shaped housing refers to the housing 224 that has a geometric shape resembling a trapezoid, where the base of the trapezoid that is smaller may correspond to the input end 202 and the base that is larger may correspond to the output end 212. In the cone-shaped housing, the circular base may be oriented towards the remote optical node, such as the second optical node 102B, and the apex may cover the input end 202.

In accordance with an embodiment, the optical antenna apparatus 200A may further comprise a middle portion 230 comprising one or more other lens (not shown), where the one or more incoming optical signals 206 and 208 of the one or more optical fibers 210A and 210B passes through the lens 204, the one or more other lens, and then the prism 214 to form the one or more free-space optical beams 216 and 218. The middle portion 230 of the optical antenna apparatus 200A may be an intermediate section between the input end 202 and the output end 212. In an exemplary implementation, the middle portion 230 may include one or more other lenses, which may be concave or lens of other shapes.

In accordance with an embodiment, wherein the lens 204 may be positioned in the optical antenna apparatus 200A in the input end 202 such that the one or more incoming optical signals 206 and 208 that diverge from an output of an optical transceiver or an optical amplifier (i.e., output of the optical element 222) may be focused on the first side 214A of the prism 214 to cause a collimated emission of the one or more free-space optical beams 216 and 218 from the second side 214B of the prism 214 of the output end 212. As the focused optical signals strike the first side 214A of the prism 214, they undergo refraction within the prism material, which causes the optical signals to be collimated, i.e., the optical signals become parallel and have minimal divergence. The collimated optical beams, i.e., the one or more free-space optical beams 216 and 218, may be then emitted from the second side 214B of the prism 214 from the output end 212 of the optical antenna apparatus 200A. The lens 204 ensures that the focused optical signals are directed towards the first side 214A of the prism 214, causing collimated emissions of the free-space optical beams 216 and 218 from the output end 212. This arrangement optimizes the direction, alignment, and collimation of the optical beams for effective free-space optical communication.

Figure 2B:
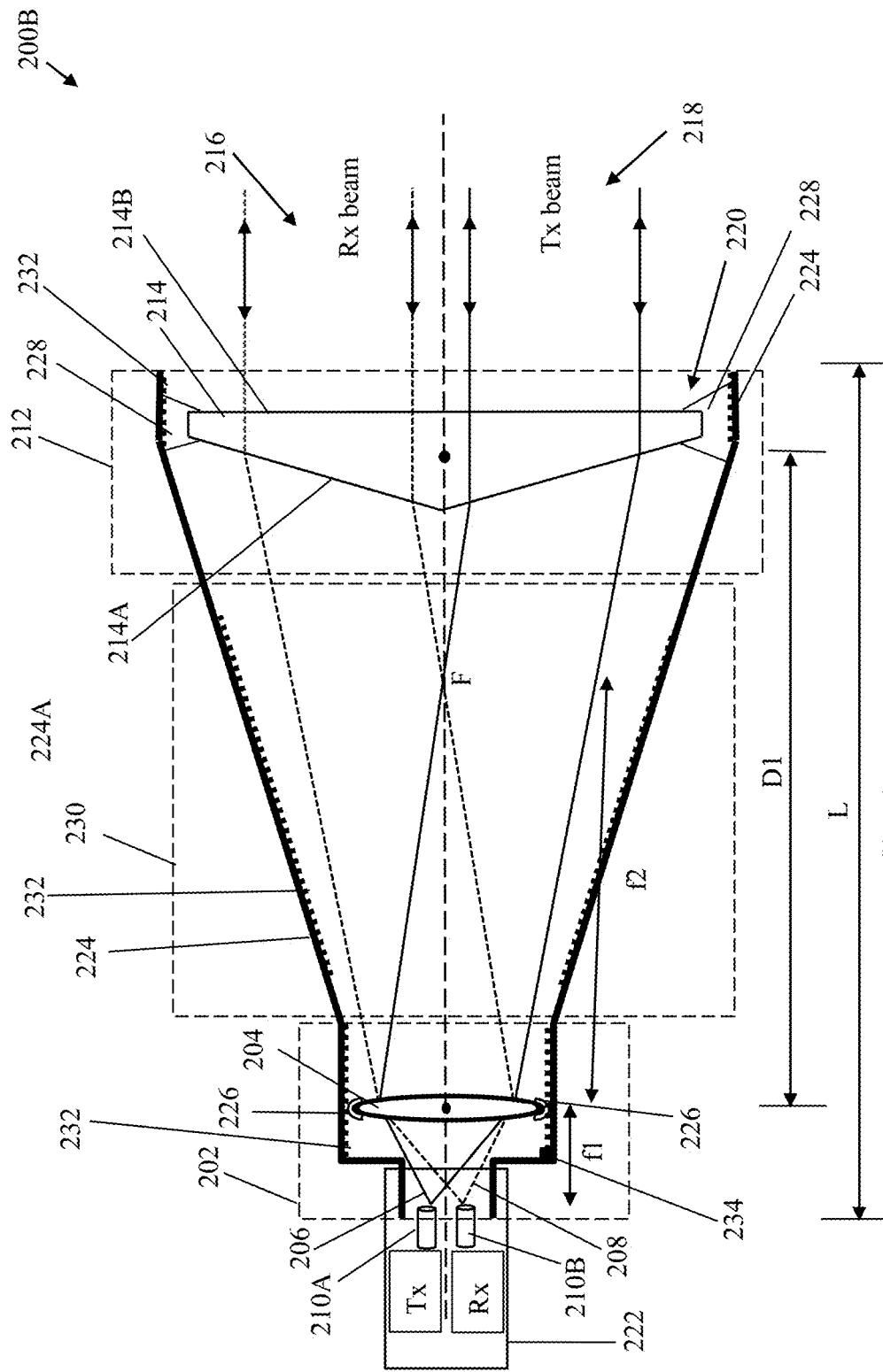
FIG. 2B is a diagram that illustrates various components of an exemplary optical antenna apparatus, in accordance with another exemplary embodiment of the disclosure.

FIG. 2B is a diagram that illustrates various components of an exemplary optical antenna apparatus, in accordance with another exemplary embodiment of the disclosure. FIG. 2B is explained in conjunction with elements from FIGS. 1A, 1B, and 2A. With reference to FIG. 2B, there is shown an optical antenna apparatus 200B for free-space optical communication. The optical antenna apparatus 200B is similar to the optical antenna apparatus 200A except that the positioning of the lens 204 and the prism 212 is automatically adjustable within the housing 224 of the optical antenna apparatus 200B. In an implementation, the optical antenna apparatus 200B may correspond to the optical antenna apparatus 106 of FIG. 1A and FIG. 1B.

In accordance with an embodiment, the optical antenna apparatus 200B may further comprise a control circuitry 234 and an electro-mechanical arrangement 232 operatively coupled with the lens 204 and the prism 214. The control circuitry 234 may be communicatively coupled to the electro-mechanical arrangement 232 and may be configured to control the electro-mechanical arrangement 232 to cause movement of at least one or both of one or more lenses, such as the lens 204, and the prism 214. Examples of the control circuitry 234 may include, but are not limited to a microcontroller, a microprocessor, a state machine, a hardware processor, or other control circuits. The electro-mechanical arrangement 232 may comprise one or more components depending on the specific design and requirements of the optical antenna apparatus 200B. For example, in an implementation, the electro-mechanical arrangement 232 may include a slider where the plurality of slots 226 and 228 may be movably coupled to the slider configured to slide on the slider while holding the lens 204 and the prism 214 within the interior 220 of the housing 224. In another implementation, the electro-mechanical arrangement 232 may include an electric motor, an actuator, or a sensor to provide feedback on the position and alignment of the lens 204 and the prism 214. This feedback enables the control circuitry 234 to accurately calibrate the beam parameters of the optical beams. In other words, the control circuitry 234 may be configured to calibrate a position of each the lens 204 and the prism 214 in the optical antenna apparatus 200B using the electro-mechanical arrangement 232 such that each of the lens 204 and prism is moved back and forth to adjust one or more beam parameters of the one or more free-space optical beams. In an implementation, the one or more beam parameters may include beam width or a beam diameter of a collimated beam, beam pointing accuracy, beam collimation, optical signal intensity, spectral response, and the like. For example, the one or more beam parameters may be adjusted by changing one or more of the focal length of the lens 204, the angle of the prism 214, changing the position of the lens 204 or the prism 214, or by changing the type of lens 204 or prism 214 that is used.

Various embodiments of the disclosure may provide an optical antenna apparatus 106, 200A, or 200B (FIGS. 1A, 1B, 2A and 2B). The optical antenna apparatus 106, 200A, or 200B for an optical node for free-space optical communication, may comprise an input end 202 comprising a lens 204 positioned to receive one or more incoming optical signals, wherein the one or more incoming optical signals are received from one or more optical fibers connected at the input end 202. The optical antenna apparatus 106, 200A, or 200B may further comprise an output end 212 comprising a prism 214 positioned at a defined distance DI from the lens 204, wherein the one or more incoming optical signals of the one or more optical fibers passes through the lens 204 and then the prism 214 to form one or more free-space optical beams for a bi-directional free-space optical communication with a remote optical node (e.g., the second optical node 102B).

While various embodiments described in the present disclosure have been described above, it should be understood that they have been presented by way of example, and not limitation. It is to be understood that various changes in form and detail can be made therein without departing from the scope of the present disclosure. In addition to using hardware (e.g., within or coupled to a central processing unit ("CPU"), microprocessor, micro controller, digital signal processor, processor core, system on chip ("SOC") or any other device), implementations may also be embodied in software (e.g. computer readable code, program code, and/or instructions disposed in any form, such as source, object or machine language) disposed for example in a non-transitory computer-readable medium configured to store the software. Such software can enable, for example, the function, fabrication, modeling, simulation, description and/or testing of the apparatus and methods describe herein. For example, this can be accomplished through the use of general program languages (e.g., C, C++), hardware description languages (HDL) including Verilog HDL, VHDL, and so on, or other available programs. Such software can be disposed in any known non-transitory computer-readable medium, such as semiconductor, magnetic disc, or optical disc (e.g., CD-ROM, DVD-ROM, etc.). The software can also be disposed as computer data embodied in a non-transitory computer-readable transmission medium (e.g., solid state memory any other non-transitory medium including digital, optical, analog-based medium, such as removable storage media). Embodiments of the present disclosure may include methods of providing the apparatus described herein by providing software describing the apparatus and subsequently transmitting the software as a computer data signal over a communication network including the internet and intranets.

It is to be further understood that the system described herein may be included in a semiconductor intellectual property core, such as a microprocessor core (e.g., embodied in HDL) and transformed to hardware in the production of integrated circuits. Additionally, the system described herein may be embodied as a combination of hardware and software. Thus, the present disclosure should not be limited by any of the above-described exemplary embodiments but should be defined only in accordance with the following claims and their equivalents.

What is claimed is:

1. An optical antenna apparatus, comprising:
   an input end comprising a lens, wherein
      the input end is connected to one or more optical fibers, and
      the lens is configured to receive one or more incoming optical signals from the one or more optical fibers-connected at the input end; and
   an output end comprising a prism and an opening, wherein
      the prism is at a defined distance from the lens,
      the prism includes:
         a first side that includes a first face and a second face, wherein
            the second face is different from the first face,
            each of the first face and the second face of the first side faces the lens,
            the first face is configured to receive a first optical signal of the one or more incoming optical signals, and
            the second face is configured to receive a second optical signal of the one or more incoming optical signals; and
         a second side that has a planar shape,
      the second side faces away from the lens towards the opening,
      the second side of the prism is configured to output one or more free-space optical beams based on each of the first optical signal and the second optical signal received by the first side of the prism, and
      the one or more free-space optical beams are output for a bi-directional free-space optical communication with a remote optical node.

2. The optical antenna apparatus according to claim 1, wherein the defined distance of the prism from the lens is greater than a focal length of the lens.

3. The optical antenna apparatus according to claim 1, wherein the lens is a convex lens.

4. The optical antenna apparatus according to claim 1, wherein the first side of the prism has a triangular shape.

5. The optical antenna apparatus according to claim 1, wherein the prism has a size that is larger than a size of the lens.

6. The optical antenna apparatus according to claim 1, wherein
   the input end is removably attached as a plugin to one of an optical transceiver (TRx) or an optical amplifier,
   the one or more optical fibers are connected to the input end via the one of the optical TRx or the optical amplifier, and
   the one of the optical TRx or the optical amplifier is one of a Small Form-factor Pluggable (SPF) optical module device, an enhanced SPF (SPF+), a ten gigabit SPF (XPF), or a pluggable serial-to-serial data-agnostic multi-rate optical TRx or amplifier.

7. The optical antenna apparatus according to claim 1, wherein
   the input end comprises one of an optical transceiver (TRx) or an optical amplifier,
   the one or more optical fibers are connected to the input end via the one of the optical TRx or the optical amplifier, and
   the one of the optical TRx or the optical amplifier is one of a Small Form-factor Pluggable (SPF) optical module device, an enhanced SPF (SPF+), a ten gigabit SPF (XPF), or a pluggable serial-to-serial data-agnostic multi-rate optical TRx or amplifier.

8. The optical antenna apparatus according to claim 1, wherein
   the one or more incoming optical signals comprises a transmit (Tx) optical signal and a receive (Rx) optical signal, the Tx optical signal and the Rx optical signal are converted concurrently, after passing through the lens and the prism, to a first free-space optical Tx beam and a first free-space optical Rx beam, respectively, and the one or more free-space optical beams includes the first free-space optical Tx beam and the first free-space optical Rx beam.

9. The optical antenna apparatus according to claim 1, wherein the one or more incoming optical signals comprises different optical signals, each optical signal of the one or more incoming optical signals has a different wavelength and carries a corresponding data stream.

10. The optical antenna apparatus according to claim 1, further comprising a housing to accommodate and cover the lens and the prism, wherein an interior of the housing comprises a plurality of slots configured to hold each of the lens at a corresponding position of the lens and the prism at a corresponding position of the prism along a length of the housing such that the prism is at the defined distance from the lens.

11. The optical antenna apparatus according to claim 10, wherein the housing is one of a trapezoid-shaped or a cone-shaped housing.

12. The optical antenna apparatus according to claim 1, further comprising a middle portion comprising at least one lens different from the lens, wherein the one or more incoming optical signals of the one or more optical fibers pass-passes through the lens, the at least one lens, and the prism to form the one or more free-space optical beams.

13. The optical antenna apparatus according to claim 1, wherein a position of the lens in the optical antenna apparatus in the input end is such that the one or more incoming optical signals that diverge from an output of one of an optical transceiver or an optical amplifier are focused on the first side of the prism to cause a collimated emission of the one or more free-space optical beams from the second side of the prism of the output end.

14. The optical antenna apparatus according to claim 1, further comprising a control circuitry and an electro-mechanical arrangement operatively coupled with the lens and the prism, wherein the control circuitry is configured to control the electro-mechanical arrangement to calibrate a position of each of the lens and the prism in the optical antenna apparatus such that each of the lens and the prism is moved back and forth to adjust one or more beam parameters of the one or more free-space optical beams.

15. An optical antenna apparatus, comprising:

an input end comprising a lens, wherein the input end is connected to one or more optical fibers via one of an optical transceiver or an optical amplifier, the input end is configured to receive one or more incoming optical signals from the one or more optical fibers via the one of the optical transceiver or the optical amplifier, the one or more incoming optical signals comprise different optical signals, and each optical signal of the one or more incoming optical signals has a different wavelength and carries a corresponding data stream; and an output end comprising a prism at a defined distance from the lens, wherein the one or more incoming optical signals of the one or more optical fibers pass through the lens to the prism to form one or more free-space optical beams for free-space optical communication, and the defined distance of the prism from the lens is greater than a focal length of the lens.

16. The optical antenna apparatus according to claim 15, wherein the one of the optical transceiver or the optical amplifier is one of a Small Form-factor Pluggable (SPF) optical module device, an enhanced SPF (SPF+), a ten gigabit SPF (XPF), or a pluggable serial-to-serial data-agnostic multi-rate optical TRx or amplifier.

17. The optical antenna apparatus according to claim 15, further comprising a middle portion comprising at least one lens different from the lens, wherein the one or more incoming optical signals of the one or more optical fibers pass through the lens, the at least one lens and the prism to form the one or more free-space optical beams.

18. The optical antenna apparatus according to claim 15, further comprising a control circuitry and an electro-mechanical arrangement operatively coupled with the lens and the prism, wherein the control circuitry is configured to control the electro-mechanical arrangement to calibrate a position of each of the lens and the prism in the optical antenna apparatus such that each of the lens and the prism is moved back and forth to adjust one or more beam parameters of the one or more free-space optical beams.

19. The optical antenna apparatus according to claim 15, wherein the one or more incoming optical signals comprises a transmit (Tx) optical signal and a receive (Rx) optical signal, the Tx optical signal and the Rx optical signal are converted concurrently, after passing through the lens and the prism, to a first free-space optical Tx beam and a first free-space optical Rx beam, respectively, and the one or more free-space optical beams includes the first free-space optical Tx beam and the first free-space optical Rx beam.

* * * * *